No. 812,437. PATENTED FEB. 13, 1906.
R. R. MORRISON.
FIRE CLAY BLOCK AND ATTACHMENT.
APPLICATION FILED JAN. 16, 1905.
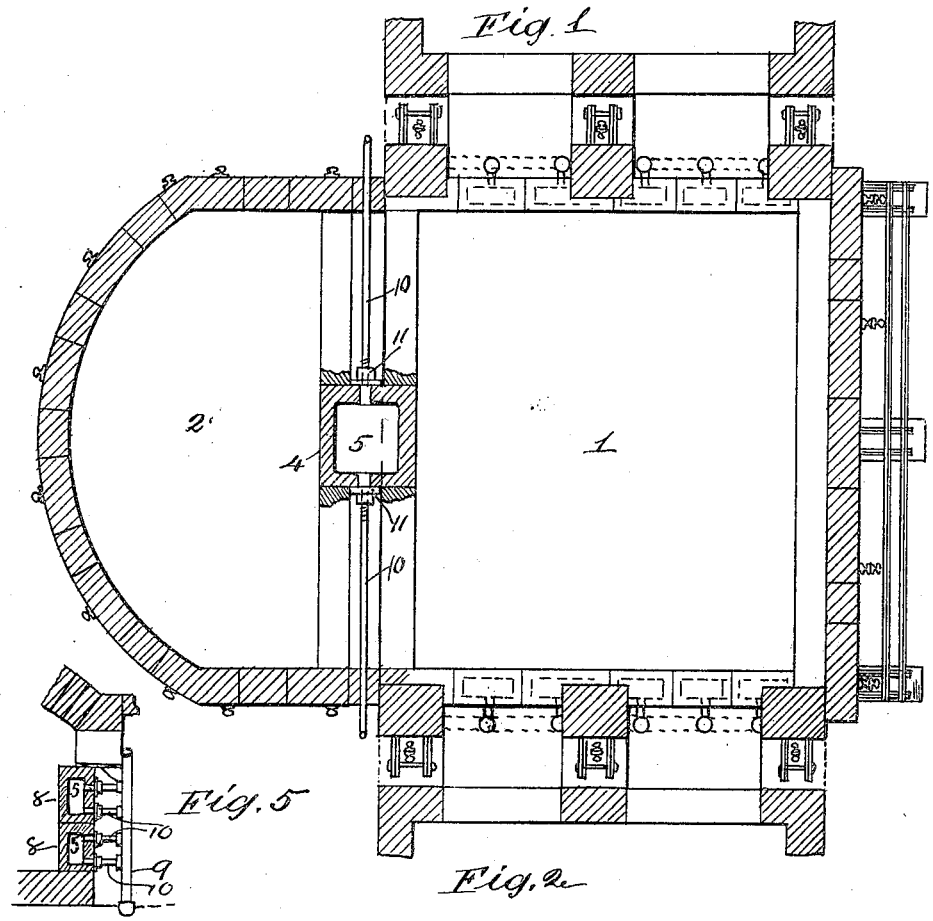
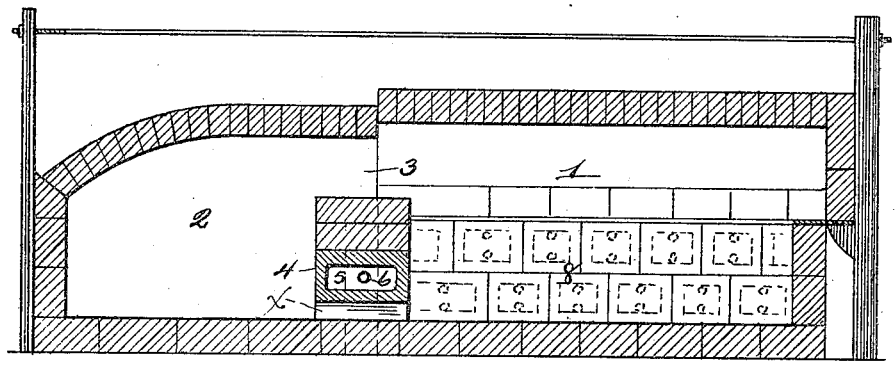
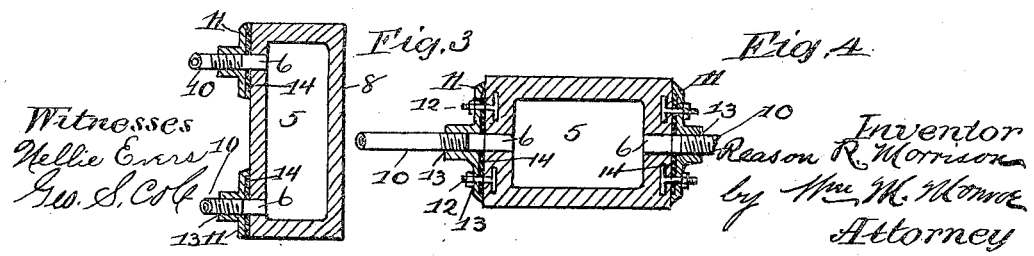

UNITED STATES PATENT OFFICE.

REASON R. MORRISON, OF MINERAL CITY, OHIO.

FIRE-CLAY BLOCK AND ATTACHMENT.

No. 812,437.  Specification of Letters Patent.  Patented Feb. 13, 1906.

Application filed January 16, 1905. Serial No. 241,219.

*To all whom it may concern:*

Be it known that I, REASON R. MORRISON, a citizen of the United States, and a resident of Mineral City, county of Tuscarawas, State of Ohio, have invented certain new and useful Improvements in Fire-Clay Blocks and Attachments, of which I hereby declare the following to be a full, clear, and exact description, such as will enable others skilled in the art to which it appertains to make and use the same.

The object of the invention is to provide a refractory fire-clay block for use in connection with furnaces in which great heat is evolved, such as fluxing-furnaces for continuously heating glass or for continuously working glass or other substances, the primary object being to provide a refractory block in a situation where it is more than usually exposed to heat with an internal circulation of a cooling medium, such as water or steam, whereby although the exterior of the block will retain the required degree of heat to avoid cooling the contents of the furnace the cooling circulation through the block will prevent the block itself from becoming disintegrated and destroyed by constant use.

The invention consists in a block of refractory fire-clay having an interior opening and inlet and outlet openings communicating therewith through the outer wall of the opening and in the details of construction and combination of parts, as hereinafter described, shown in the accompanying drawings, and specifically pointed out in the claim.

In the accompanying drawings, Figure 1 is a plan of a continuous melting-chamber and continuous working chamber of a glass-melting furnace, showing a narrow neck between the chambers and refractory fire-clay block therein. Fig. 2 is a longitudinal section thereof. Figs. 3 and 4 are enlarged detail views in section of refractory fire-clay blocks broken away to show the interior opening and circulating-passages. Fig. 5 is a vertical section of furnace-wall, showing a circulating-pipe for a cooling medium and pipes connecting the same with the circulating-passages of the several blocks forming the wall.

In the views, 1 is the continuous melting-chamber of the furnace; 2, the continuous working chamber; 3, the neck connecting these chambers.

4 is a transversely-placed neck block or brick which connects the walls of the neck above the bottom and prevents the froth of the glass from entering the working chamber, so that only the solid portion of the glass will pass thereunder at $x$, Fig. 2. This brick is subject to great heat, and if it disintegrates on account of the heat and the constant wearing movement of the current of glass below a hole would be formed through which the froth on the surface of the glass would enter the working chamber and injure the quality of the glass. To prevent this result, an interior opening 5 is formed in this block, and through each end of the block is formed a passage 6, communicating with this central opening, one serving for the inlet of the cooling medium and the other for the outlet thereof. In this manner the block is preserved from overheating to a degree which would destroy it; but the heat in the neck of the furnace is too great to permit the block to become cool enough to cool the melted contents of the furnace.

At 8 8 are seen blocks comprising together the side walls of the melting-chamber in which the temperature is very high. Here the blocks are shown provided with central openings in the same manner as just described for the neck-block; but the blocks are stood upon end and the openings 6 for circulation of the cooling medium are made in the exterior wall one above the other, as in Fig. 3. The blocks can all be connected in one circulating system by means of a vertical pipe 9 and lateral branches 10, which enter the openings in the walls of the several blocks.

In order to connect the pipes which convey the water or steam to the blocks with the circulating-passages in the blocks, a coupling connection is shown in Figs. 3 and 4 where the plate 11 is seen attached securely to the block by means of hooked or T-headed bolts 12, and the pipe is inserted in the central threaded opening 13 in the center of the plate. An asbestos or other packing-gasket 14 is seen let into the inner face of this plate, which makes the coupling water or steam tight.

The advantages of this device are obvious for the preservation of refractory fire-blocks in furnaces in which great heat is generated and which are full of melted masses of material which would destroy the blocks in course of time if not protected.

Having described my invention, what I claim as new, and desire to secure by Letters Patent, is—

The combination with a block of refractory fire-clay, provided with a central opening and inlet and outlet circulating-openings in the wall of said central opening, of couplings for the attachment of circulating-pipes to said circulating-openings consisting of plates provided with openings registering with said inlet and outlet openings respectively and holding-bolts embedded in said block and passing through said plates and gaskets between said plates and block, substantially as described.

In testimony whereof I hereunto set my hand this 30th day of December, 1904.

REASON R. MORRISON.

In presence of—
WM. M. MONROE,
E. C. KINCAID.